(12) United States Patent
Sigl et al.

(10) Patent No.: US 10,987,765 B2
(45) Date of Patent: Apr. 27, 2021

(54) INDUCTION WELD BEAD SHAPING

(71) Applicant: Illinois Tool Works Inc., Glenview, IL (US)

(72) Inventors: Dennis Sigl, Greenville, WI (US);
Dustin Wagner, Appleton, WI (US);
Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 230 days.

(21) Appl. No.: 15/239,381

(22) Filed: Aug. 17, 2016

(65) Prior Publication Data

US 2018/0050426 A1 Feb. 22, 2018

(51) Int. Cl.

| B23K 37/06 | (2006.01) |
|---|---|
| B23K 26/348 | (2014.01) |
| B23K 26/70 | (2014.01) |
| B23K 9/173 | (2006.01) |
| B23K 26/14 | (2014.01) |
| B23K 26/242 | (2014.01) |
| B23K 9/167 | (2006.01) |
| B23K 9/02 | (2006.01) |

(Continued)

(52) U.S. Cl.
CPC .............. B23K 37/06 (2013.01); B23K 9/02 (2013.01); B23K 9/04 (2013.01); B23K 9/167 (2013.01); B23K 9/173 (2013.01); B23K 9/32 (2013.01); B23K 26/1464 (2013.01); B23K 26/242 (2015.10); B23K 26/348 (2015.10); B23K 26/702 (2015.10); B23K 31/003 (2013.01); H05B 6/10 (2013.01); *B23K 2101/06* (2018.08)

(58) Field of Classification Search
CPC ... B23K 9/02; B23K 9/04; B23K 9/32; B23K 9/167; B23K 9/173; B23K 26/14; B23K 26/21; B23K 26/70; B23K 26/242; B23K 26/1429; B23K 26/1464; B23K 31/00; B23K 31/003; B23K 37/06; H05B 6/42; H05B 6/10; H05B 6/101
See application file for complete search history.

(56) References Cited

U.S. PATENT DOCUMENTS

| 5,466,916 A * | 11/1995 | Iguchi ................. B29C 37/0082 |
|---|---|---|
| | | 219/633 |
| 6,265,701 B1 * | 7/2001 | Bickel ...................... B23K 9/00 |
| | | 219/136 |

(Continued)

FOREIGN PATENT DOCUMENTS

| CN | 102451946 A | 5/2012 |
|---|---|---|
| CN | 103518115 A | 1/2014 |

(Continued)

OTHER PUBLICATIONS

Zhou, Jun, et al., "Effects of Using an External Electromagnetic Force on Transport Phenomena and Weld Quality in Laser Welding" Proceedings of the ASME 2012 Summer Heat Transfer Conference, Jul. 8-12, 2012 (6 pages).

(Continued)

*Primary Examiner* — Brian W Jennison
(74) *Attorney, Agent, or Firm* — McAndrews, Held & Malloy, Ltd.

(57) ABSTRACT

A system, apparatus, and method in which an induction head is used to impinge an electromagnetic force field on a molten metal bead to shape same, e.g., to flatten same.

24 Claims, 9 Drawing Sheets

(51) Int. Cl.
*H05B 6/10* (2006.01)
*B23K 9/32* (2006.01)
*B23K 9/04* (2006.01)
*B23K 31/00* (2006.01)
*B23K 101/06* (2006.01)

(56) References Cited

U.S. PATENT DOCUMENTS

| | | | |
|---|---|---|---|
| 2004/0069774 A1* | 4/2004 | Markeg.ang.rd | H05B 6/74 219/677 |
| 2008/0105659 A1* | 5/2008 | Arnett | B23K 15/0006 219/121.14 |
| 2011/0284527 A1* | 11/2011 | Holverson | B23K 9/1006 219/660 |
| 2012/0107644 A1* | 5/2012 | Zhao | C21D 1/18 428/683 |
| 2015/0083710 A1* | 3/2015 | Albrecht | B23K 26/60 219/601 |
| 2016/0105933 A1 | 4/2016 | Jones | |

FOREIGN PATENT DOCUMENTS

| | | |
|---|---|---|
| CN | 203432310 U | 2/2014 |
| CN | 203592241 U | 5/2014 |
| CN | 105555457 A | 5/2016 |
| CN | 105705263 A | 6/2016 |
| EP | 1013372 A | 6/2000 |
| WO | 2015048090 | 4/2015 |

OTHER PUBLICATIONS

Shoichi, M., et al., "Study on the application of electromagnetic controlled molten pool welding process in overhead and flat position welding" Science and Technology of Welding and Joining, 2013, vol. 18, No. 1, pp. 38-44 (7 pages).

Xiao, R. S., et al., New approach to improve the laser welding process of aluminum by using an external electrical current, Journal of Materials Science Letters, 2001, pp. 2163-2165 (3 pages).

Willgoss, R. A., "Electromagnetic control of fluid motion in TIG weld pools", Paper 49, pp. 361-373 (13 pages).

Int'l Search Report and Written Opinion PCT/US2017/044341 dated Nov. 13, 2017 (14 pages).

Ueyama, et al., "Effects of torch configuration and welding current on weld bead formation in high speed tandem pulsed gas metal arc welding of steel sheets", Science and Technology of Welding and Joining, 2005, vol. 10, No. 6, pp. 750-759.

* cited by examiner

FILLET WELD

GROOVE WELD

INDUCTION WELD BEAD SHAPING

TECHNICAL FIELD

The present disclosure relates generally to systems for metalworking operations including welding, cladding and additive manufacturing operations.

BACKGROUND

A welding operation is often used to fuse two materials together, typically two workpieces or two portions of a workpiece. A filler material in the form of a consumable electrode or a filler wire is often added to the joint to form a pool of molten material. During a welding operation, particularly when the weld is elongated due to relative travel of a torch along a joint, a weld bead may be formed. In general, a weld bead refers to a deposit that is made during a single welding pass.

A cladding operation involves the deposition of metal on a workpiece, and similarly a bead may be formed.

An additive manufacturing operation is similar to the cladding process, but generally refers to a process of layering deposits of material, e.g., metal, to form a three-dimensional structure. This is also referred to as 3-D manufacturing or printing.

All three of these operations can be referred to generically as a metalworking operation.

In fillet welding, when a horizontal weld is performed, the bottom toe angle and radius of the bead can become sharper than the top angle due to gravitational forces on the bead. When a vertical weld is performed, the molten metal has a tendency to flow down the weld line, also due to gravity, and this can create unwanted shaping of the weld.

When pipe welding a horizontal pipe from about the 4:00 o'clock position to about the 8:00 o'clock position, the same gravitational forces cause the molten bead to droop out of the weld.

In FIG. 1A, there is illustrated in cross section a horizontal fillet weld so as to illustrate the various portions of the weld. As illustrated, the weld includes a fusion zone where the filler and workpiece materials fuse together. As measured from a root of the weld, there is a difference between the actual throat of the weld and theoretical throat of the weld. This difference is reflected as a mounding of on the top of the weld. This mounding also creates toes between the original surfaces of the workpieces and the surface of the excess mound of bead material. These toes include toe angles that can be measured.

As illustrated in FIG. 1B, similar mounding can occur in horizontal groove welds.

FIG. 2, illustrates how the stress concentration at the toes of a weld would increase with decreasing toe angles. It can be seen that the stress concentration factor greatly increases exponentially as the fillet radius/thickness decreases.

In some instances, a machining process may be performed after a welding operation to further improve the weld. For example, a machining process involving rotary burr grinders or disc grinders may be performed to reduce certain stress concentrations of the weld. Additionally or alternatively, peening, tungsten inert gas (TIG) dressing, plasma dressing, laser welding, and/or any similar machining may be performed on the weld.

However, these machining processes are often difficult to control with respect to the weld. In addition, these processes take a considerable amount of time to achieve the desired result, thereby decreasing productivity. Also, some of these machining processes, such as grinding, may result in sparks, dust, and/or other debris, which may create a hazardous environment.

Further, there is known the problem of "humping" which occurs at high welding speeds. This includes a periodic undulation in the weld bead profile. The occurrence of humping limits the range of usable welding speeds in most fusion welding processes and can prevent increases in productivity in a welding operation. See, e.g., T. C. Nguyen, et al. "The humping phenomenon during high speed gas metal arc welding," Science and Technology of Welding and Joining (2005), Vol. 10, No. 4, pp 447-459.

SUMMARY

The systems, apparatus, and methods described herein attempt to cure the deficiencies of the above-mentioned conventional systems by providing a metalworking operation with induction molten metal bead shaping. To that end, an electromagnetic force is generated and applied on a molten metal bead while the bead is still sufficiently malleable, to shape it to reduce or eliminate unwanted shapes or forms. This force can push and/or contain the molten material until is sufficiently solidified to not undergo further movement.

Induction bead shaping enables favorable, fatigue grade welds to be created for various metal inert gas processes. For example, the systems and methods described herein are configured to apply forces to weld bead formations, such as molten nuggets, such that weld beads with favorable toe angles and reduced stress concentrations are created during a welding operation in a single pass.

In an embodiment, there is provided a welding system comprising a welding torch; and an induction coil positioned to apply an electromagnetic force to a welding bead created by the welding torch to re-form the welding bead.

In an embodiment, the welding system also comprises a conveyance mechanism to convey a workpiece relative to the welding torch and the induction coil, wherein, the induction coil is positioned downstream of the welding torch.

In an embodiment of the welding system, the induction coil includes a concentrator that concentrates the electromagnetic force.

In an embodiment of the welding system, the concentrator includes a ferrite core.

In an embodiment of the welding system, the induction coil includes a tube in which a cooling fluid flows.

In an embodiment of the welding system, the coil is coupled to a transformer configured to provide a current and voltage to the induction coil sufficient for the induction coil to generate an electromagnetic force to flatten the weld bead.

In an embodiment of the welding system, the welding system also comprises a transformer to deliver 300 amperes or more of current at a frequency of 10 kHz.

In an embodiment, there is provided a metalworking system comprising a torch; and an induction coil to subject a molten metal bead to an electromagnetic force sufficient to re-form the molten metal bead.

In an embodiment, the metalworking system is a welding apparatus or a cladding apparatus.

In an embodiment, the metalworking system also comprises a hot wire cladding apparatus.

In an embodiment, the metalworking system comprises a laser welding apparatus.

In an embodiment, the metalworking apparatus comprises a hot wire laser welding apparatus.

In an embodiment, the metalworking system further comprises a conveyance mechanism to convey a workpiece relative to the welding torch and the induction coil, wherein, the induction coil is positioned downstream of the welding torch.

In an embodiment of the metalworking system, the induction coil includes a concentrator that concentrates the electromagnetic force.

In an embodiment of the metalworking system, the concentrator includes a ferrite core.

In an embodiment of the metalworking system, the induction coil includes a tube in which a cooling fluid flows.

In an embodiment of the metalworking system, the coil is coupled to a transformer configured to provide a current and voltage to the induction coil sufficient for the induction coil to generate an electromagnetic force to flatten the weld bead.

In an embodiment, the metalworking system also comprises a transformer to deliver 300 amperes or more of current at a frequency of 10 kHz.

In an embodiment, the metalworking apparatus also comprises an arc welding apparatus.

In an embodiment, there is provided a method of making a fillet or lap weld comprising: applying a high energy to one or more workpieces, a wire, or both the one or more work pieces and the wire to create a weld bead; using an induction coil to create an electromagnetic force; and subjecting the weld bead to the electromagnetic force created to re-form the weld bead.

In an embodiment, the method also comprises generating the high energy using a welding apparatus.

In an embodiment, the method also comprises generating the high energy using a laser welding apparatus.

In an embodiment, the method also comprises generating the high energy using a TIG apparatus.

In an embodiment, the method also comprises generating the high energy using a hotwire cladding apparatus.

Additional features and advantages of exemplary embodiments will be set forth in the description which follows, and in part will be apparent from the description. The objectives and advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The systems and methods described herein relate to systems and methods pertaining to welding with induction. The systems and methods are described in detail below.

As is well known, a current in a conductor generates a magnetic field in accordance with the left hand rule.

Figure 1A:
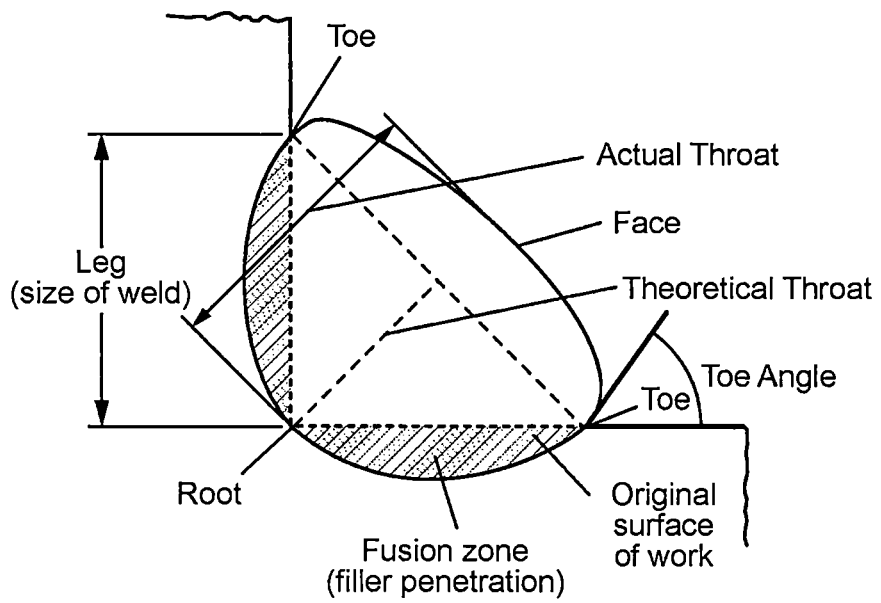
FIG. 1A illustrates portions of a typical horizontal fillet weld.
Figure 1B:
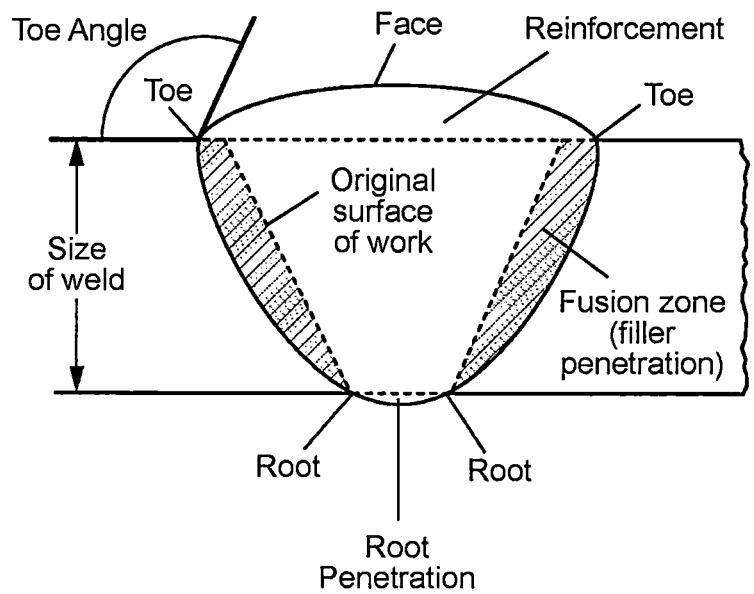
FIG. 1B illustrates portions of a typical groove weld.
Figure 2:
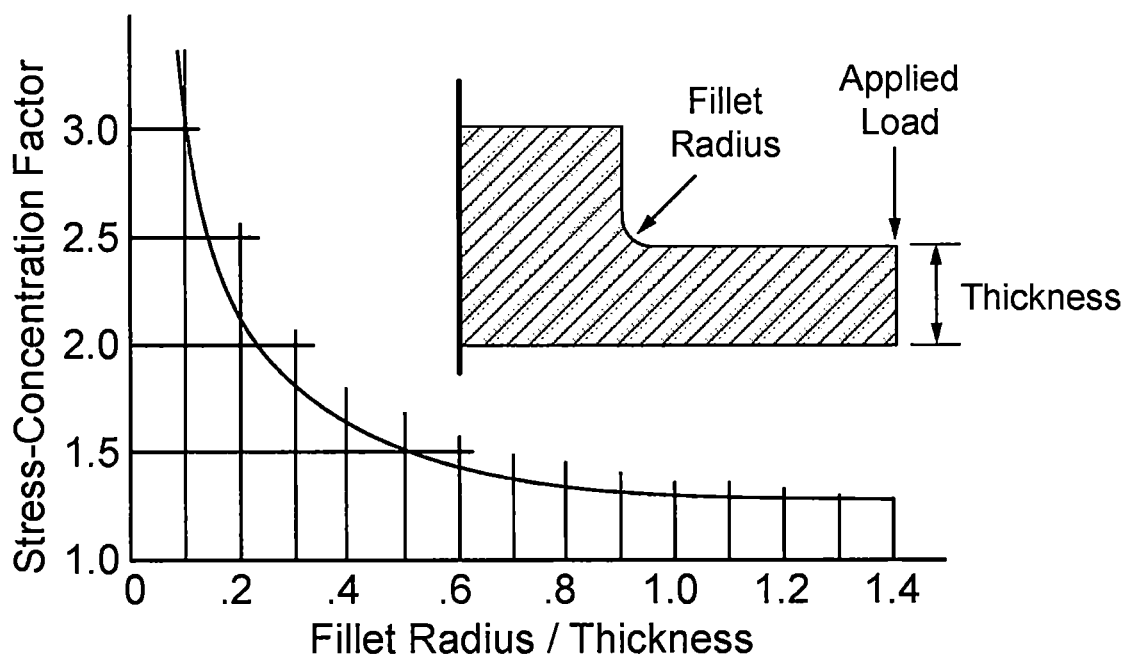
FIG. 2 illustrates how the stress concentration at the toes of a weld would increase with decreasing toe angles.
Figure 3:
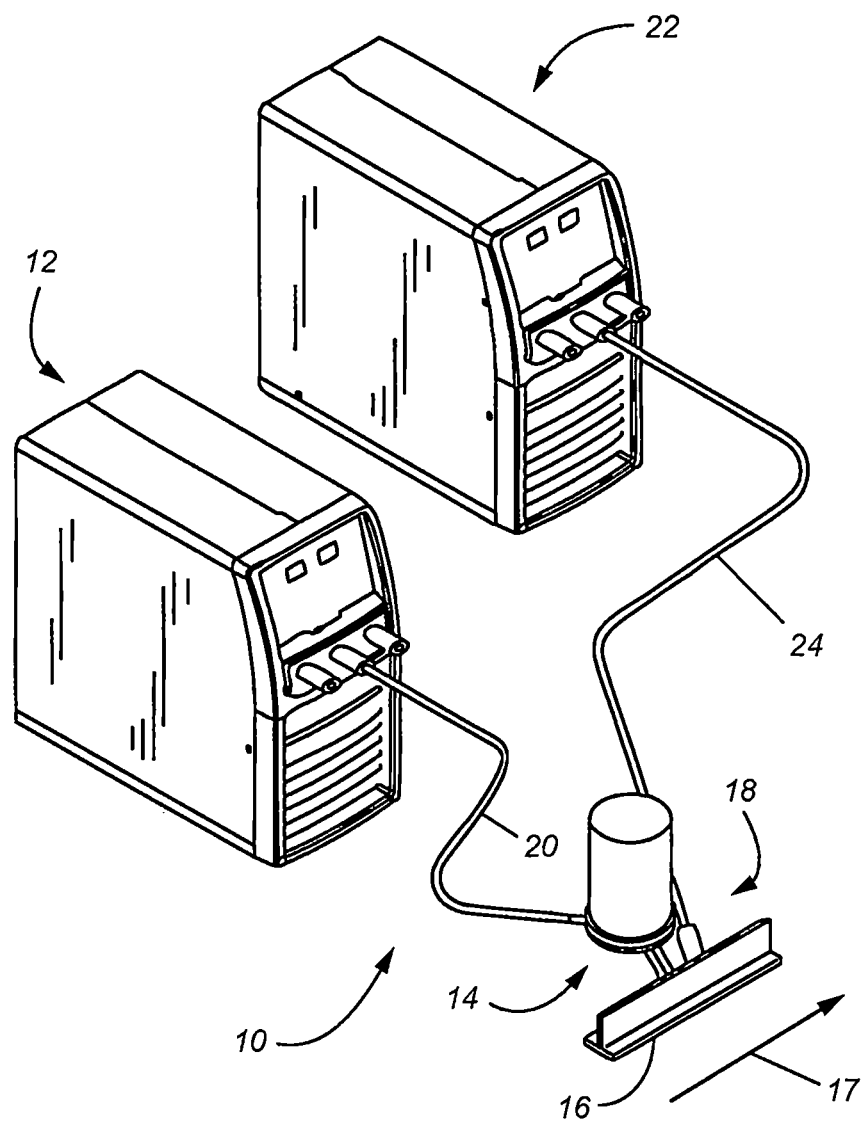
FIG. 3 illustrates a perspective view of the system according to an exemplary embodiment.

Referring generally to FIG. 3, a perspective view of the system according to an exemplary embodiment is illustrated. In this illustration, system has been simplified in order to focus on main components of the system. Obviously, the system includes other elements, which are known in the art and not shown.

As illustrated in FIG. 3, an induction system 10 includes an induction power supply 12 and an induction assembly 14 that function together on a workpiece 16 (e.g., a fillet weld workpiece in the illustrated embodiment). For example, in certain embodiments, the induction assembly 14 may be moved by a robotic positioning system relative to the workpiece 16 along a weld path behind a welding torch 18 that may also be moved by a robotic positioning system such that the induction assembly 14 may exert an electromagnetic (EM) force on the weld produced on the workpiece 16 by the welding torch 18. The induction assembly 14 receives power, coolant, and so forth, from the induction power supply 12 via a first cable and conduit bundle 20, and the welding torch 18 receives welding power, welding wire, a gas supply, and so forth, from a welding power supply 22 and conduit bundle 24.

In certain embodiments, the induction power supply 12 provides alternating current (AC) power to the induction assembly 14 via the cable 20. The AC power provided to the induction assembly 14 produces an electromagnetic field. The induction power supply 12 may be any power supply capable of outputting sufficient power to the induction assembly 14 to produce the EM field. While induction power supplies for heating purposes may need to produce currents of 3000 or more amperes, for the purposes of bead shaping it has been determined that the power supply 12 need only output current of about 300 amperes or less. This allows the weld to freeze in the desired shape without putting excessive extra heat into the part. In certain embodiments, the induction power supply 12 includes converter circuitry as described herein, which provides the AC output that is applied to the induction assembly 14.

Figure 4:
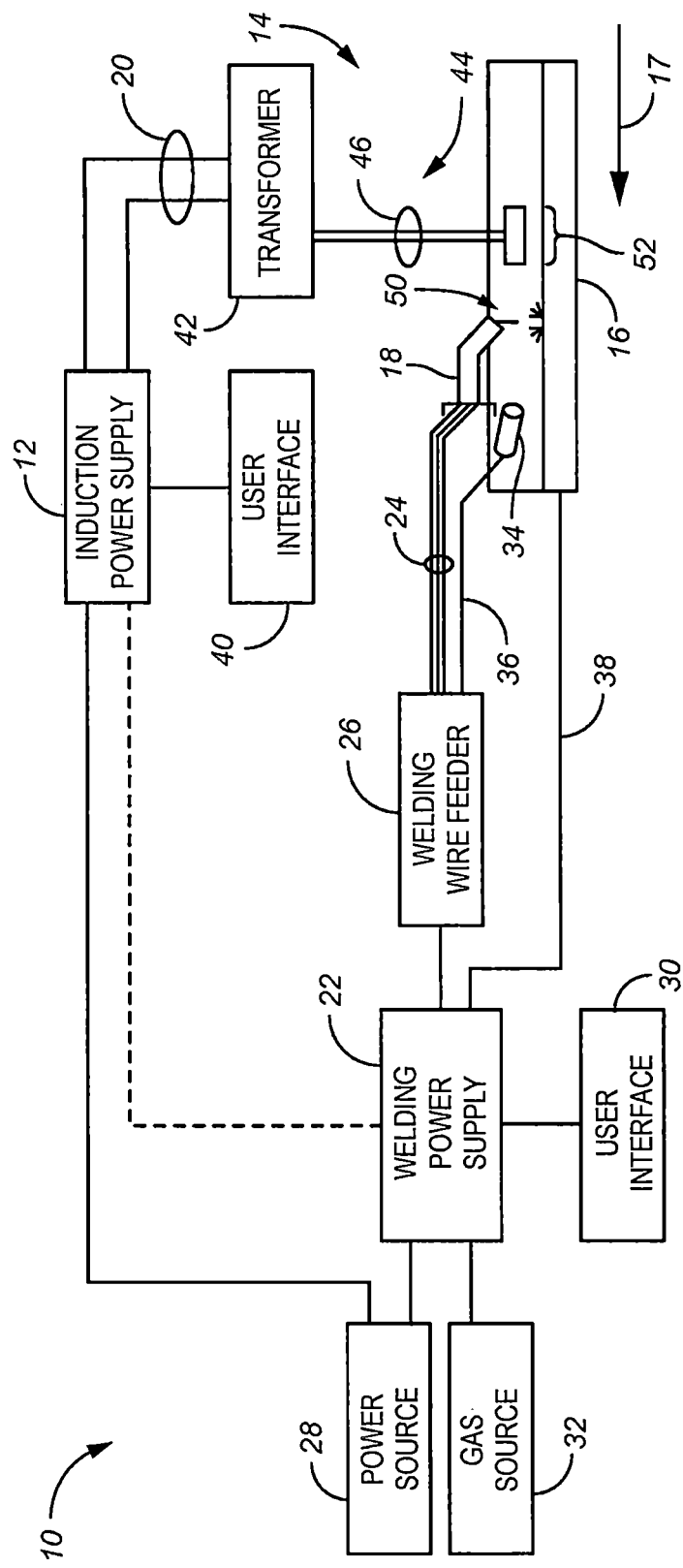
FIG. 4 illustrates a block diagram of the system according to an exemplary embodiment.

Referring generally to FIG. 4, a block diagram of the system 10 is illustrated according to an exemplary embodiment.

The system 10 includes the welding power supply 22, a welding wire feeder 26, and the welding torch 18. The welding power supply 22 may be a power converter or an inverter based welding power supply requiring a power source 28. Many different circuit designs may be provided in the power source, and many different welding regimes may be envisaged (e.g., direct current, alternating current, pulsed, short circuit, etc.) Any of these conventional circuits and process technologies may be used in conjunction with the present induction bead shaping techniques. In other embodiments, the welding power supply 22 may be a generator or alternator welding power supply.

The welding power supply 22 may also include a user interface 30 for adjusting various welding parameters such as voltage and current, and for connecting a power source 28, if required. Additionally, a gas source 32 may be coupled to the welding power supply 22. The gas source 32 is the source of the shielding gas that is supplied to the welding torch 18. The gas source 32 also supplies shielding gas to an auxiliary shielding gas diffuser 34. For example, in certain embodiments, the gas source 32 may supply argon gas. As will be appreciated, the shielding gas is applied to the location of the liquid weld pool by the welding torch 18 and the auxiliary gas diffuser 34 to prevent absorption of atmospheric gases which may cause metallurgical damage to the weld. As shown, the welding power supply 22 is coupled to the welding wire feeder 26. For example, the welding power supply 22 may be coupled to the welding wire feeder 26 by a feeder power lead, a weld cable, a gas hose, and a control cable.

The welding wire feeder 26 shown in the illustrated embodiment provides welding wire to the welding torch 18 for use in the welding operation. A variety of welding wires may be used. For example, the welding wire may be solid carbon steel, solid aluminum, solid stainless steel, composite and flux cored wire, and so forth. The present embodiments may be used with any suitable type of electrode, and any suitable wire composition. Furthermore, the thickness of the welding wire may vary depending on the welding application for which the welding wire is used. For example, the welding wire may be 0.045, 0.052, 1/16, 3/32, 1/8, or any other diameter. Furthermore, the welding wire feeder 26 may enclose a variety of internal components such as a wire feed drive system, an electric motor assembly, an electric motor, and so forth. The welding wire feeder 26 may further include a control panel (not shown) that allows a user to set one or more wire feed parameters, such as wire feed speed. In the illustrated embodiment, the auxiliary shielding gas diffuser 34 is also coupled to the welding wire feeder 26 by a gas hose 36. However, the welding wire feeder 26 may be used with any wire feeding process including gas operations (gas metal arc welding (GMAW)) or gasless operations (shielded metal arc welding (SMAW) or self-shielding flux cored arc welding (FCAW)).

As shown, the welding wire is fed to the welding torch 18 through the cable 24. The cable 24 may also supply gas to the welding torch 18. As further shown, a separate cable 38 couples the welding power supply 22 to the workpiece 16 (typically via a clamp) to complete the circuit between the welding power supply 22 and the welding torch 18 during a welding operation.

The exemplary system 10 also includes the induction power supply 12 and the induction assembly 14. As illustrated, the induction power supply 12 includes a user interface 40. The user interface 40 may include buttons, knobs, dials, and so forth to allow an operator to regulate various operating parameters of the induction power supply 12. For example, the user interface 40 may be configured to enable an operator to set and adjust the frequency of the alternating current produced by the induction power supply 12. Similarly, the user interface 40 may enable an operator to select a desired output to an induction coil 44 of the induction assembly 14. The user interface 40 may also include one or more displays configured to provide system feedback to the operator (e.g., real-time temperature of the secondary induction coil 44, travel speed of the secondary induction coil 44 relative to the workpiece 16, and so forth). The induction power supply 12 is coupled to a transformer 42 via the cable bundle 20. In certain embodiments, the transformer 42 may be an air-cooled or a liquid-cooled system. For example, a first conduit may enable flow of a coolant into the transformer 42, and another conduit may enable flow of the coolant from the transformer to a heat exchanger or other device that removes heat from the coolant.

In certain embodiments, the alternating electrical current exits the transformer 42 and is supplied to the induction coil 44 by electrical conductors 46. As discussed in detail below, the electrical conductors 46 may have a hollow core and may also route the flowing coolant through the induction coil 44. In the illustrated embodiment, the induction coil 44 is disposed proximate to the workpiece 16. As the alternating current flows through the induction coil 44, an electromagnetic field is generated about the coil 44, and the field can exert an EM force on the weld bead on the workpiece 16. As shown, the induction coil 44 is positioned aft of the welding torch 18. In other words, for a welding torch 18 operating and traveling in a direction 17, the induction coil 44 is placed trailing the welding torch 18. As a result, the coil 44 can be used on the weld bead to re-form it.

As shown, the welding power supply 22 and the induction power supply 12 may also be coupled. For example, the welding power supply 22 and the induction power supply 12 may be coupled by a hard wire, through a wireless connection, over a network, and so forth. As discussed in detail below, the welding power supply 22 and the induction power supply 12 may exchange data and information during the operation of the exemplary system 10. More particularly, the welding power supply 22 and the induction power supply 12 may function in cooperation (e.g., utilize feedback from one another) to adjust various operating parameters of the exemplary system 10.

As can be appreciated, the principles of the system 10 can be applied in other operations and systems in which molten metal is deposited. For example, in cladding, a molten metal bead is deposited but may need flattening. Similarly, in an additive manufacturing process, metal can be deposited with relative travel between the torch or feeding gun and the object being created. The induction coil can be used to re-form the just deposited metal, e.g., to flatten it or spread it.

Figure 5:
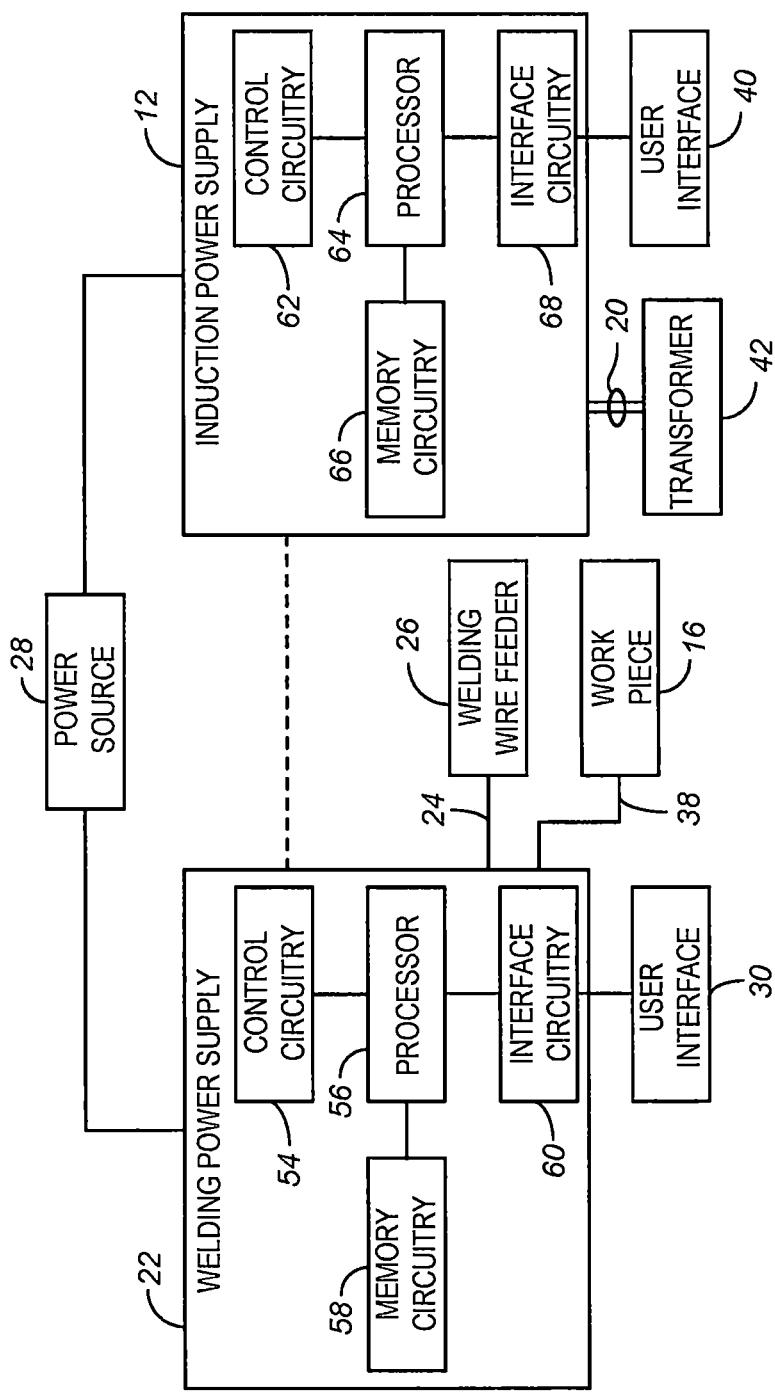
FIG. 5 illustrates a block diagram of components of the exemplary embodiment.

FIG. 5 is a block diagram illustrating certain internal components of the exemplary induction system 10 in accordance with the present disclosure. As discussed above, the power source 28 may power the welding power supply 22 and/or the induction power supply 12. The welding power supply 22 provides power to the welding wire feeder 26, and the welding power supply 22 is coupled to the workpiece 16, thereby completing the circuit between the welding power supply 22 and the welding torch 18 during a welding operation. The induction power supply 12 generates an alternating electrical current that is supplied to the transformer 42, which subsequently routes the current to the secondary induction coil 44. As mentioned above, the welding power supply 22 and the induction power supply 12 may be coupled and configured to exchange information and data (e.g., operating parameters, settings, user input, etc.) to enable the welding power supply 22 and the induction power supply 12 to function cooperatively.

The welding power supply 22 includes several internal components to regulate various operating parameters of the system 10. In the illustrated embodiment, the welding power supply 22 includes control circuitry 54, a processor 56, memory circuitry 58, and interface circuitry 60. The control circuitry 54 is configured to apply control signals to the welding power supply 22 and/or the welding wire feeder 26. For example, the control circuitry 54 may provide control signals to the welding wire feeder 26 relating to the voltage or current provided by the welding power supply 22. The control circuitry 54 may also provide control signals for regulating the operation of the welding wire feeder 26 such as pulse width modulated (PWM) signals to regulate a duty cycle for a motor assembly in the welding wire feeder 26, and so forth.

The control circuitry 54 is further coupled to the processor 56, memory circuitry 58 and interface circuitry 60. The interface circuitry 60 is coupled to the user interface 30 of the welding power supply 22. As discussed above, the user interface 30 is configured to enable an operator to input and control various settings of the welding power supply 22. For example, the user interface 30 may include a menu for selecting a desired voltage or current output to the welding wire feeder 26. Additionally, the user interface 30 may include a menu or list of metal working processes or welding wire materials and diameters. As will be appreciated, different welding processes, welding wire materials, and welding wire diameters may have different characteristics and may require differing configurations for various operating parameters. For example, configuration parameters requiring differing values may include voltage output, current output, wire feed speed, wire feed torque, and so forth. Preset values for such configuration parameters, as well as others, may be stored in the memory circuitry 58 for each of a variety of welding processes, welding wire materials, and welding wire diameters.

By way of example, a user may select a welding process from a menu of a plurality of different welding processes displayed on the user interface 30 of the welding power supply 22. The user interface 30 communicates the selection of the welding process to the interface circuitry 60, which communicates the selection to the processor 56. The processor 56 then retrieves the particular configuration parameters for the welding process stored in the memory circuitry 58. Thereafter, the processor 56 sends the configuration parameters to the control circuitry 54 in order that the control circuitry 54 may apply appropriate control signals to the welding wire feeder 26. In certain embodiments, as discussed below, the control circuitry 54 of the welding power supply 22 may also communicate the configuration parameters to the induction power supply 12.

In the illustrated embodiment, the induction power supply 12 includes control circuitry 62, a processor 64, memory circuitry 66, and interface circuitry 68. The control circuitry 62 is configured to apply control signals to the induction power supply 12 and/or the transformer 42. For example, the control circuitry 62 may provide control signals relating to the alternating electrical current (e.g., alternating current frequency) supplied by the induction power supply 12 to the transformer 42. Additionally, the control circuitry 62 may regulate the operation of a cooling system used with the induction power supply 12 and/or the transformer 42. As mentioned above, the induction assembly 14 may use air or a liquid coolant to provide circulating cooling fluid throughout the induction assembly 14. For example, the control circuitry 62 may regulate a flow of a liquid coolant through the transformer 42 and the induction coil 44 to maintain a desired temperature of the induction assembly 14.

The control circuitry 62 is further coupled to the processor 64, memory circuitry 66, and interface circuitry 68. The interface circuitry 68 is coupled to the user interface 40 of the induction power supply 12.

As mentioned above, the user interface 40 of the induction power supply 12 may enable an operator to regulate one or more operating parameters or settings of the induction power supply system 12. For example, the user interface 40 may enable a user to select a particular design of the induction assembly 14 from a menu of designs. As will be appreciated, different induction coil 44 designs may have different configuration parameters. Different power supplies and transformers also may have different configuration parameters. For example, different designs may have different maximum operating tem-peratures, and may require different frequencies of alternating current to achieve a desired EM force.

Similarly, the coolant or calling fluid used to cool the induction assembly 14 may have different configuration parameters (e.g., heat transfer coefficients, viscosities, flow rates, and so forth). Preset values for such configuration parameters, as well as others, may be stored in the memory circuitry 66. For example, the user interface 40 may communicate a user selection of the secondary induction coil 44 designs to the interface circuitry 68, which may communicate the selection to the processor 64. The processor 64 may then retrieve the particular configuration parameters for the induction coil 44 stored in the memory circuitry 66. Thereafter, the processor 64 sends the configuration parameters to the control circuitry 62 in order that the control circuitry 62 may apply appropriate control signals to the induction power supply 12 and the transformer 42.

As mentioned above, the welding power supply 22 and the induction power supply 12 may be coupled to one another by a hard wire, wireless connection, network connection, or the like. In particular, the welding power supply 22 and the induction power supply 12 may be configured to send and receive data and information to one another relating to the operating of the system 10. For example, the welding power supply 22 and the induction power supply 12 may communicate with one another to coordinate the speed of the induction assembly 14 and the welding torch 18 with respect to the workpiece 16. As will be appreciated, in certain embodiments, the coil 44 and the welding torch 18 may both be designed for automated operation. As a result, the welding power supply 22 and the induction power supply 12 may be coupled and configured to communicate and maintain a constant distance between the coil 44 and the welding arc 50, as the secondary induction coil 44 welding torch 18 travel along the workpiece 16 in the direction 17. For example, the welding torch 18 and the induction coil 44 may each have sensors configured to measure a travel speed or temperature along the workpiece 16.

For further example, the welding power supply 22 may communicate a user selected welding, cladding or additive manufacturing process (i.e., in the exemplary embodiment, a welding process selected by an operator through the user interface 30) to the induction power supply 12. More specifically, the control circuitry 54 of the welding power supply 22 may communicate the welding process selection to the control circuitry 62 of the induction power supply 12. Thereafter, the control circuitry 62 of the induction power supply 12 may modify any of a variety of operating parameters based on the user selected process. For example, the control circuitry 62 may begin or end the process, or regulate the frequency or amplitude of the alternating current provided to the induction coil 44 or the flow rate of a coolant through the transformer 42 and/or the induction coil 44 to achieve a desired EM force of the induction coil 44 based on the process selected.

More specifically, for a selected welding process, the processor 64 may retrieve configuration parameters for the selected welding process from the memory circuitry 66 and send the configuration parameters to the control circuitry 62. Similarly, the control circuitry 62 of the induction power supply 12 may send operating information or data to the control circuitry 54 of the welding power supply 22. For example, the control circuitry 62 may send temperature data (e.g., maximum temperature or real-time temperature) of the induction coil 44 to the control circuitry 54 of the welding power supply 22. Thereafter, the control circuitry 54 of the welding power supply 22 may adjust one or more operating parameters of the welding power supply and/or welding wire feeder 26 in response to the data received from the induction power supply 12. For example, the control circuitry 54 of the welding power supply 22 may begin or end the welding process or adjust the wire feed speed or torque of the welding wire feeder 26 based on the temperature data of the secondary induction coil received from the control circuitry 62 of the induction power supply 12. As will be appreciated, for lower EM forces exerted by the induction coil 44 to the localized area 52 of the workpiece 16, a slower wire feed speed may needed.

It should be noted that in certain embodiments, the power supplies 12, 22 and associated control circuits used for generation and control of induction power and welding power may be joined. That is, some or all of the circuits may be provided in a single power supply, and certain of the circuits may serve both functions (e.g., operator interface components). Additionally, a central controller may provide coordination and synchronization commands to both the welding/cutting system and the induction system.

It should also be noted that while reference is sometimes made in the present disclosure to advancement or movement of the welding torch and adjacent induction system, depending upon the welding system design, the welding torch 18 and induction assembly 14 may indeed be displaced, while in other systems these may remain generally stationary, with the workpiece or workpieces being moved. Such may be the case, for example, in certain robotic or automated operations, in submerged arc applications, and so forth. Both scenarios are intended to be covered by the present disclosure, and references to moving a torch and induction should be understood to include any relative motion between these components and the workpiece or workpieces Referring generally to FIG. 6, a perspective view of the induction assembly 14 according to an exemplary embodiment is illustrated. The induction assembly 14 includes the transformer 42, which is in electrical communication with the induction power supply 12 and the induction coil 44. The transformer may be supported by at least one plate.

As discussed above, induction power supply is configured to supply an alternating current to the transformer. The alternating current may have a frequency from 5,000 Hz to 300,000 Hz or any suitable frequency. A 10,000 Hz signal seems to provide a good result.

In addition, as can be expected, the EM force depends upon the amount of current. At 10 kHz, the force will increase geometrically with increasing current. However, it has been determined that beads can be suitably re-shaped using a 300 ampere current at 10 kHz.

A flux concentrator such as the flux concentrator 70 may be provided with the coil. In certain embodiments, the induction coil flux concentrator may include a ferrite core. The ferrite core may be a box-like structure, as illustrated, a hollow structure, or any suitable structure.

Figure 6:
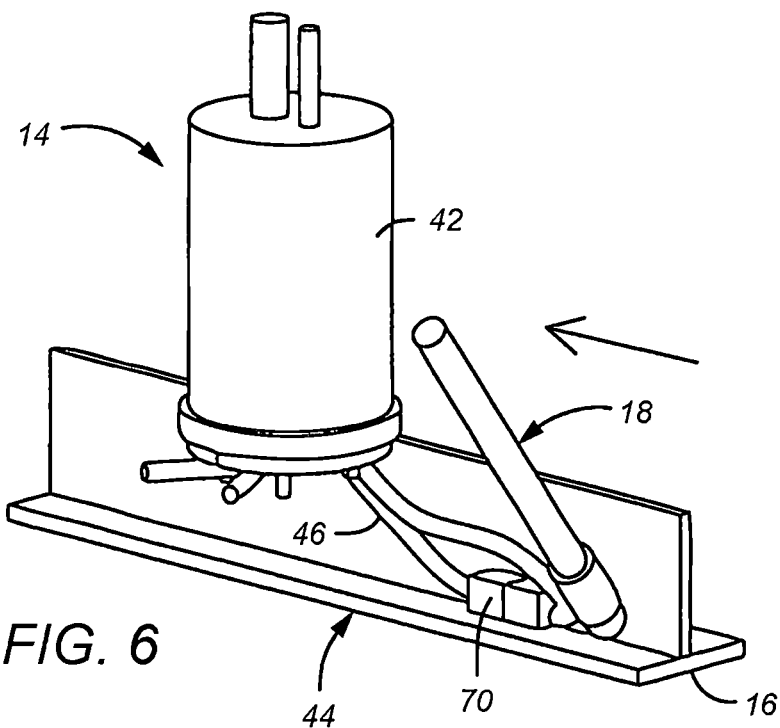
FIG. 6 illustrates a perspective view of the induction assembly according to an exemplary embodiment

As shown, induction coil 46 is placed a predetermined distance from the welding torch 18 and a predetermined distance from the molten bead, e.g., to be created as a fillet weld in FIG. 6. These distances can be determined through trial and error. More specifically, induction coil is positioned immediately behind the welding torch in order to apply a force to the molten weld nugget or the molten weld pool, which is created by the welding torch, to the weld bead formation.

Figure 7:
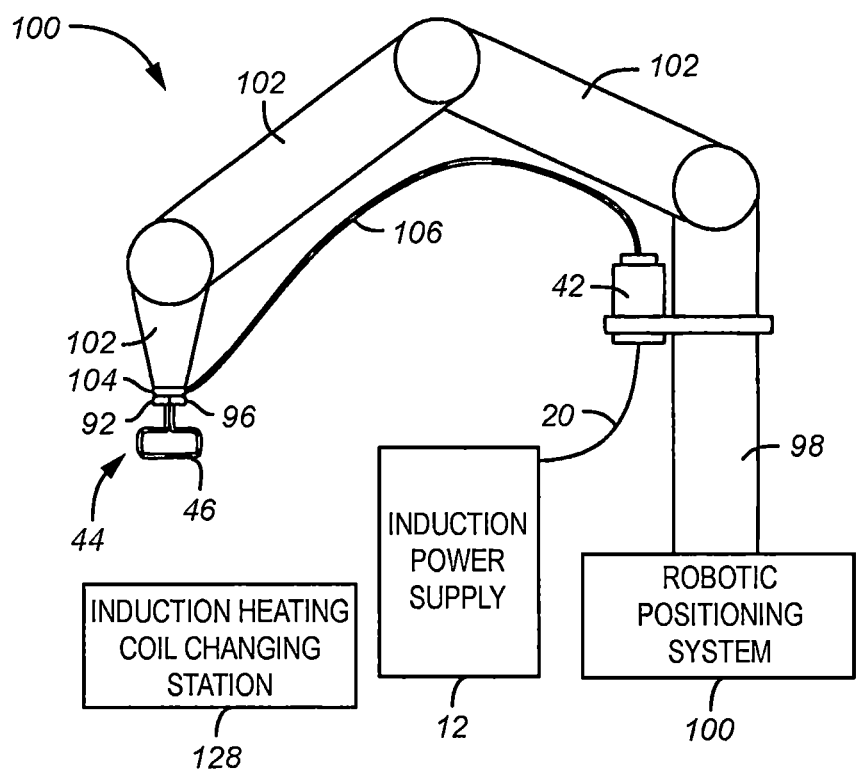
FIG. 7 illustrates a robotic arm system carrying an induction coil.

In FIG. 7, it is illustrated that the induction coil can be carried by a robot, such as robotic arm. 100, comprised of pivotably connected arm segments 102 and a base 98. As also illustrated in FIG. 7, the transformer 42 can be located remotely from the coil 46 with a suitable power cabling 106 interconnecting them. The robot 100 also includes a positioning system 100 to operate the arm segments 102 and any swiveling mechanisms to position the coil the desired distances from the welding bead and the welding torch, or to otherwise move the coil relative to a workpiece as the welding bead is formed.

The Induction coil is configured to apply an electromagnetic force on the still sufficiently molten deposited metal or weld bead, which is substantially greater than the weight of a molten nugget of the molten weld pool. This applied force is enabled to easily overcome the surface and gravitational forces of the molten nugget. In this regard, the induction coil may be used to shape the weld bead and improve its fatigue strength.

The EM force exerted by a coil is described by the Lorentz equations as follows:

$$F_{AV} = \frac{1}{2\pi}\int_0^{2\pi} F_{Inst} d\omega t = \frac{1}{2\pi}\int_0^{2\pi} \left(\int_{Vol} J(t) \times B(t) dVol\right) d\omega t$$

$F_{AV}$ is the average force density, $F_{Inst}$ is the instantaneous force density, J(t) is the current density, and B(t) is the flux density. The current density J induced in the molten bead is out of phase with the B field caused by current flowing in the coil. This is because the impedance of the molten bead has both a resistance and an inductance that changes with frequency. This phase difference is a function of frequency because of the AC impedance, the current induced in the molten bead is also a function of frequency thus the force has an optimum value when taking into account skin effect.

The induction coil may comprise a square coil, a round coil, or any suitably shaped coil. The coils will have flux lines that impinge on molten nuggets, which are created during welding operations.

Figure 8:
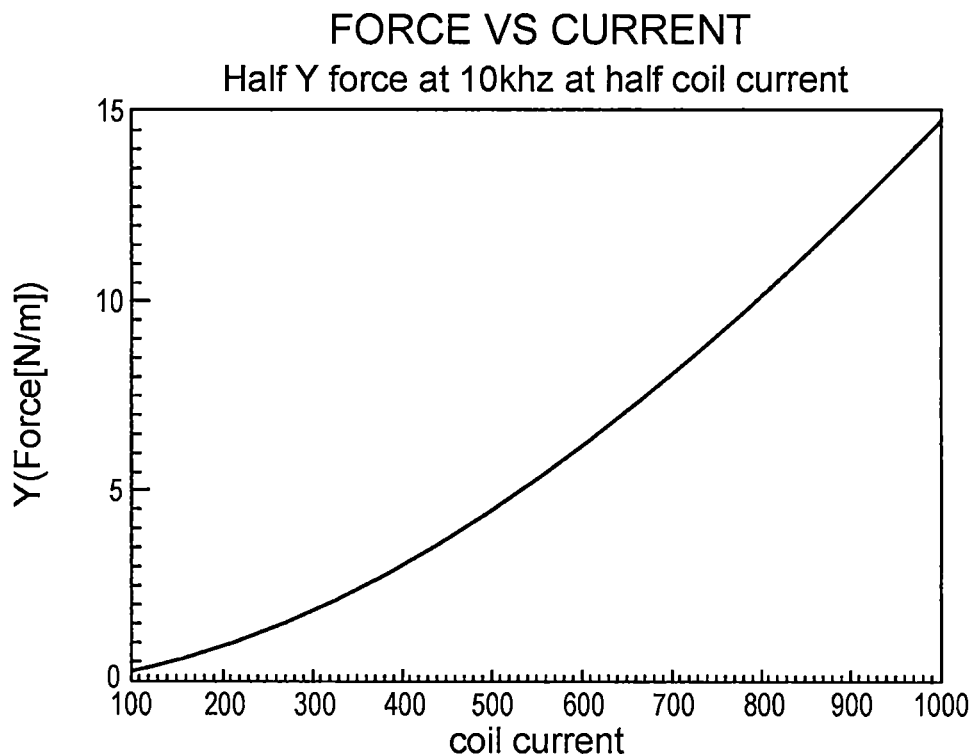
FIG. 8 illustrates an electromagnetic force versus current graph for a 10 kHz power signal.

FIG. 8 is a graph of an electromagnetic half force versus a 10 kHz coil current to illustrate a relationship between them. As illustrated, a half force varies geometrically or asymptotically with the current. In one simulation, at 300 amperes, a force of 2 Newtons/meter was created.

Figure 9:
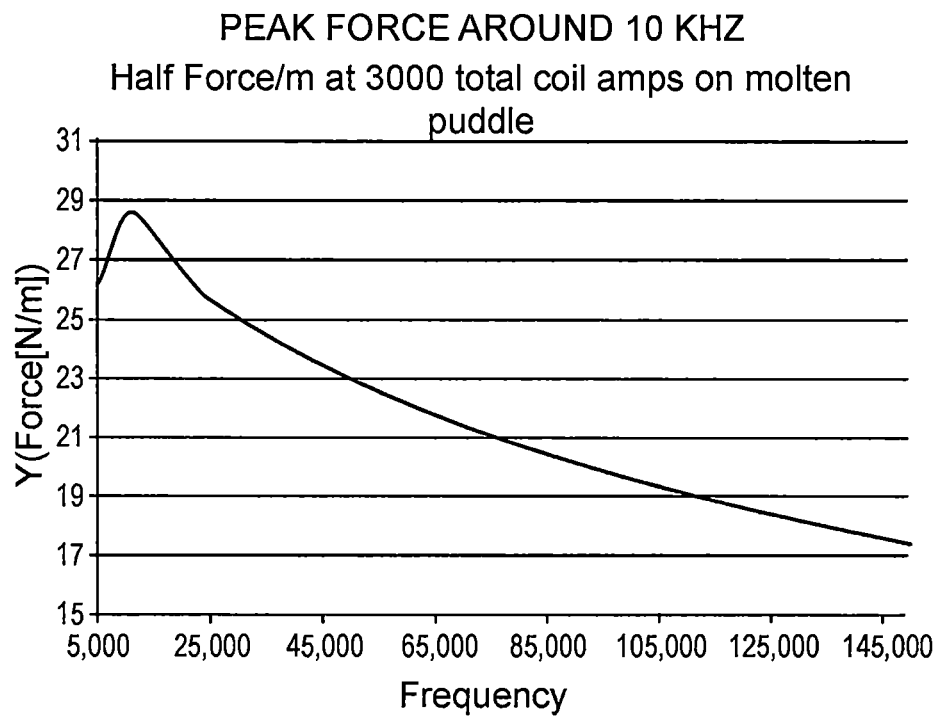
FIG. 9 illustrates an electromagnetic force versus frequency graph of for a 3000 ampere power signal.

In FIG. 9, a graph of Half force/meter versus frequency for a predetermined coil current. As illustrated, there is a peak half force at one frequency. This indicates a preferred frequency for the predetermined coil current in these applications.

In one simulation, for a current of 3000 amperes, the peak occurred at around 10 kHz.

Figure 10A:
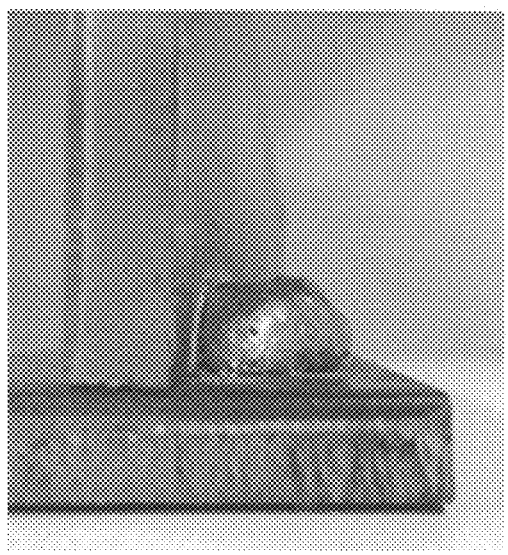
FIGS. 10A and 10B illustrates an example of a fillet weld without induction weld bead shaping.
Figure 10B:
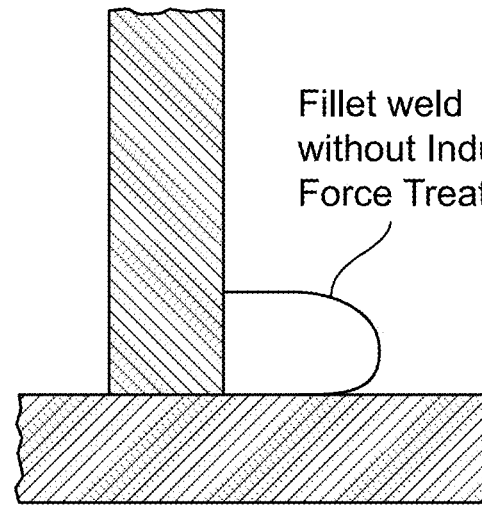

Referring generally to FIGS. 10A and 10B, an example of fillet welding without induction weld bead shaping is shown. FIG. 10A is an end view photograph, while FIG. 10B is a drawing depicting same, for ease of understanding and labeling.

In this example, the relative rate of travel between workpiece 100 and a welding torch was 30 inches per minute (IPM). Also, the voltage setting of a system without induction weld bead shaping was set to 35.1 volts and the wire feed speed was set to 560 IPM.

FIGS. 10A and 10B illustrate the fillet weld 102 resulting from this process. As can be seen, the bead 102 is bulbous with relatively high toe angles.

Figure 11A:
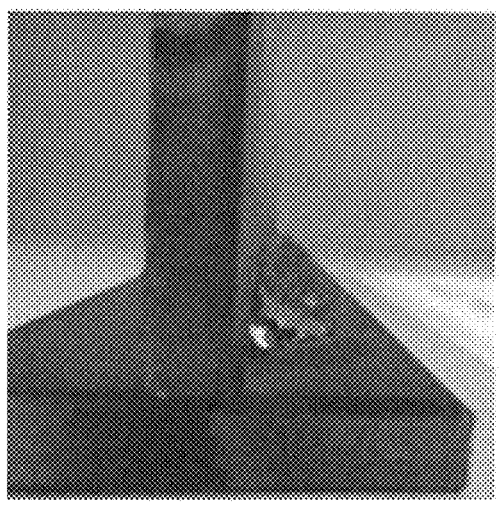
FIGS. 11A and 11B illustrates an example of a fillet weld with induction weld bead shaping according to an exemplary embodiment.
Figure 11B:
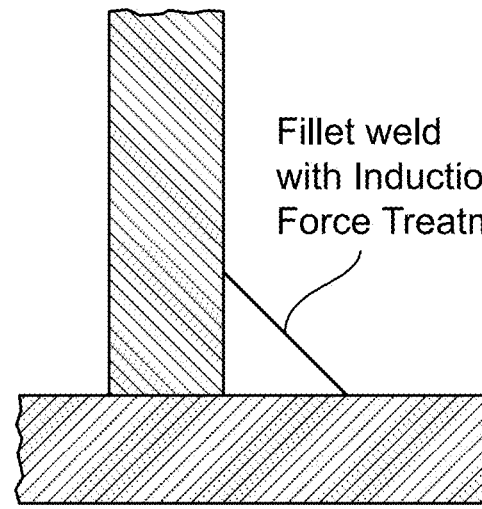

Referring generally to FIGS. 11A and 11B, an example of fillet welding performed with induction weld bead shaping according to an exemplary embodiment is shown. FIG. 11A is an end view photograph, while FIG. 11B is a drawing depicting same, for ease of understanding and labeling.

Similarly to the example of FIGS. 10A and 10B, in this example, a relative rate of travel between the workpiece 104 and the welding torch and the trailing induction coil was 30 IPM. Also, in this example, the voltage setting of the system was set to 35.1 volts and the wire feed speed was set to 560 IPM. However, in this example, the resulting fillet weld 106 comprises a flattened structure with a top surface that forms an approximate 45 degree angle with both surfaces of the fillet workpiece 104, thereby creating a strong bond. As shown, the structure of the fillet weld 106 is substantially different than the structure of the fillet weld 102 shown in FIGS. 10A and 10B. As clearly demonstrated in these illustrations, the fillet weld performed with induction weld bead shaping system provides a fillet weld with better toe angles and fatigue strength than that of the fillet weld performed without induction weld bead shaping.

As can be appreciated, the shaping of the weld bead has many uses. It can be used to form favorable toe angles on a fillet or groove weld. It can also be used to form a positive root reinforcement in the case of pipe groove welding when the bead has a tendency to droop out of the backside of the pipe joint along the bottom portion of the pipe. The induction coil can be used to lift up the drooping bead and hold it in place until it freezes.

Figure 12A:
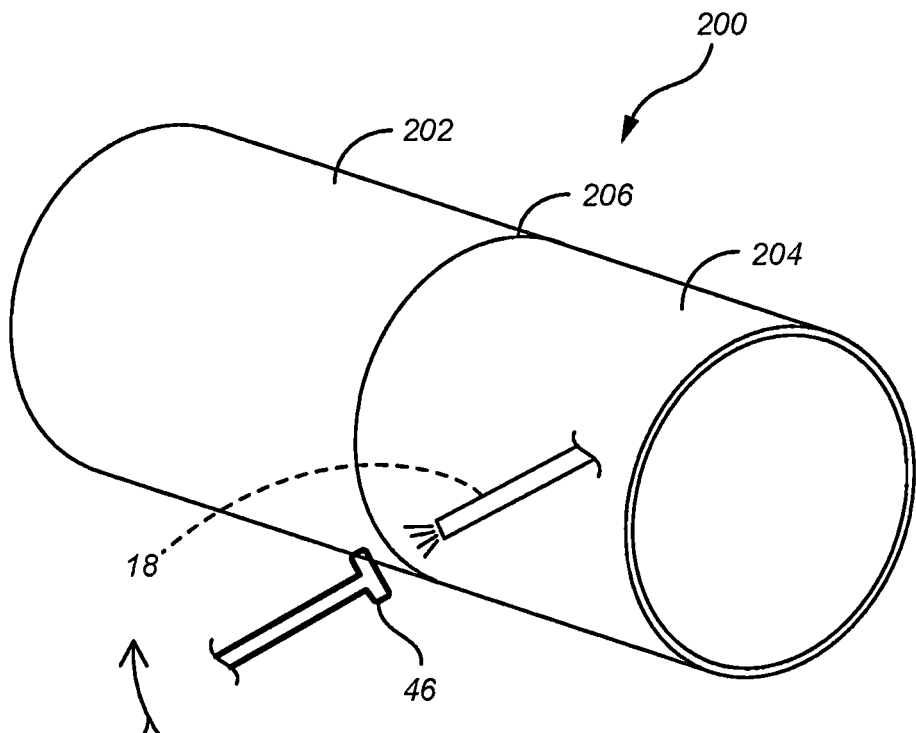
FIGS. 12A and 12B illustrate an application of an induction assembly to welding of a tubular workpiece.
Figure 12B:
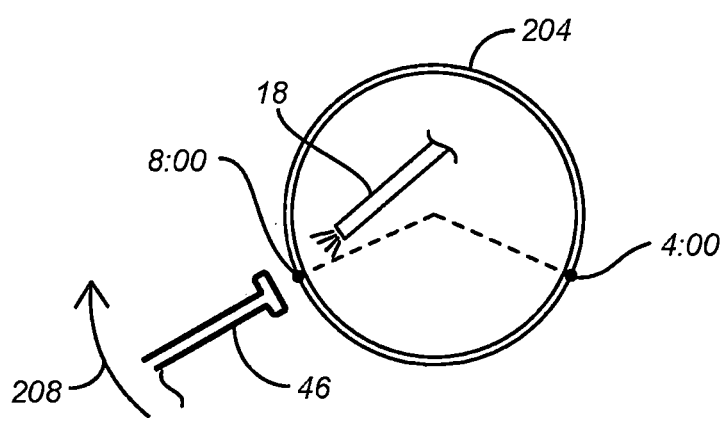

In that regard, in FIGS. 12A and 12B, a tubular workpiece 200 is shown with components 202 and 204 to be welded at weld line 206. In this embodiment, a coil 210 can be on the end of a robotic arm (not shown), and caused to follow a torch welding around the outside of the tubular workpiece 200. During part of the relative travel along the weld line 206, the torch 208 and coil 210 travel from approximately a 4:00 o'clock position to an 8:00 o'clock position or vice versa.

In accordance with principles disclosed herein, while pipe welding from the 4:00 o'clock position to the 8:00 o'clock position, or vice versa, the trailing induction can be used to support the molten puddle behind a welding torch until it cools to get a convex shaped weld root reinforcement. This would counteract the tendency of the bead to droop out of the weld. This would eliminate the need to go into the pipe on the backside and form this extra reinforcement.

As discussed above, the systems and methods described herein provide a number of advantages. For example, with induction weld bead shaping, system is able to create fatigue grade weld beads with acceptable properties. In addition, by creating these favorable welds, system is able to prevent a user from overwelding the workpiece in order to provide a sufficient bond. In effect, this leads to less consumable waste and less weld weight on the workpiece.

In addition, with induction weld bead shaping, system is able to improve a number of different types of welds. For example, system is able to create fillet welds with favorable toe angles, as well as favorable fatigue strength. Since these fillet welds are able to be formed with relatively large toe angles, these fillet welds do not require further machining in order to minimize stress concentrations. This further results in enhanced productivity.

Also, with induction weld bead shaping, system is able to create groove welds such that extra reinforcement welds are not needed for workpieces, such as pipes. System may also be used in groove welding to form a positive root reinforcement when the weld bead formation has a tendency to droop out of a backside of a pipe joint and along a bottom portion of the pipe. The induction coil may be used to lift up the drooping weld bead formation and hold it in place until the weld bead is formed.

Furthermore, the system is able to utilize a current that is 500 amperes or less in order to influence a shape of the weld bead formation with at least the induction coil. In comparison, this amperage level is a lot less than that which is required for induction pre-heating, which may be about 3000 amperes. In this regard, since a relatively low level of current is used, the weld bead formation is able to achieve the desired shape without putting excessive extra heat into the part.

The embodiments described above are intended to be exemplary. One skilled in the art recognizes that numerous alternative components and embodiments that may be substituted for or included in the particular examples described herein and such additions or substitutions still fall within the scope of the invention.

What is claimed is:

1. A welding system comprising:
   a power supply comprising a transformer to deliver at least 200 amperes of current at a frequency of at least 5 kHz;
   a welding torch configured to perform a pipe groove weld; and
   an induction coil to receive the current from the power supply to generate an electromagnetic force and apply the electromagnetic force to a welding bead created by the welding torch to flatten the welding bead or to spread the welding bead, and to lift up the welding bead against drooping caused by a gravitational force and hold the welding bead in place until the welding bead freezes, wherein the induction coil applies the electromagnetic force without putting excessive extra heat into the welding bead.

2. The welding system of claim 1, further comprising a conveyance mechanism to convey a workpiece relative to the welding torch and the induction coil, wherein, the induction coil is positioned downstream of the welding torch.

3. The welding system of claim 1, wherein the induction coil includes a concentrator that concentrates the electromagnetic force.

4. The welding system of claim 3, wherein the concentrator includes a ferrite core.

5. The welding system of claim 1, wherein the induction coil includes a tube in which a cooling fluid flows.

6. The welding system of claim 1, wherein the induction coil is coupled to a transformer configured to provide a current and voltage to the induction coil sufficient for the induction coil to generate an electromagnetic force to flatten the weld bead.

7. A metalworking apparatus comprising:
a power supply comprising a transformer to deliver at least 200 amperes of current at a frequency of at least 5 kHz;
a welding torch configured to perform a pipe groove weld; and
an induction coil to receive the current from the power supply to generate an electromagnetic force sufficient to support a molten metal bead, flatten the molten metal bead, or to spread the molten metal bead, and to lift up the molten metal bead against drooping caused by a gravitational force and hold the molten metal bead in place until the molten metal bead freezes, wherein the induction coil applies the electromagnetic force without putting excessive extra heat into the molten metal bead.

8. The metalworking apparatus of claim 7 comprising a welding apparatus or a cladding apparatus.

9. The metalworking apparatus of claim 8, comprising a hot wire cladding apparatus.

10. The metalworking apparatus of claim 8, comprising a laser welding apparatus.

11. The metalworking apparatus of claim 8, comprising a hot wire laser welding apparatus.

12. The metalworking apparatus of claim 7, further comprising a conveyance mechanism to convey a workpiece relative to the welding torch and the induction coil, wherein, the induction coil is positioned downstream of the welding torch.

13. The metalworking apparatus of claim 7, wherein the induction coil includes a concentrator that concentrates the electromagnetic force.

14. The metalworking apparatus of claim 13, wherein the concentrator includes a ferrite core.

15. The metalworking apparatus of claim 7, wherein the induction coil includes a tube in which a cooling fluid flows.

16. The metalworking apparatus of claim 7, wherein the induction coil is coupled to a transformer configured to provide a current and voltage to the induction coil for the induction coil to generate an electromagnetic force to flatten the molten metal bead or to spread the molten metal bead, wherein the electromagnetic force is the force corresponding to a current between at least 200 to 600 amperes.

17. The metalworking apparatus of claim 7, comprising an arc welding apparatus.

18. A method of making a fillet or lap weld comprising:
applying a high energy to one or more pipe workpieces, a wire, or both the one or more pipe work pieces and the wire to create a weld bead;
using a power supply to deliver at least 200 amperes of current at a frequency of 5 kHz;
using an induction coil to create an electromagnetic force by providing current of at least 200 amperes or less via converter circuitry to control the induction coil current levels; and
subjecting the weld bead to the electromagnetic force created to flatten the weld bead or to spread the weld bead, and to lift up the weld bead against downward drooping caused by a gravitational force and hold the weld bead in place until the weld bead freezes without putting excessive extra heat into the weld bead, wherein the induction coil applies the electromagnetic force without increasing the heat of the weld bead.

19. The method of claim 18, comprising generating the high energy using a welding apparatus.

20. The method of claim 18 comprising generating the high energy using a laser welding apparatus.

21. The method of claim 18, comprising generating the high energy using a TIG apparatus.

22. The method of claim 18, comprising generating the high energy using a hot-wire cladding apparatus.

23. The welding system of claim 1, wherein the induction coil is external to the pipe and trails the torch to counteract the tendency of the weld bead to droop downward out of the pipe from a bottom portion of the pipe.

24. The welding system of claim 1, wherein the pipe weld is completed without a positive root reinforcement.

* * * * *